United States Patent [19]

Takata

[11] 4,317,584
[45] Mar. 2, 1982

[54] PASSIVE VEHICLE OCCUPANT RESTRAINT BELT SYSTEM

[76] Inventor: Juichiro Takata, 3-12-1, Shinmachi, Setagayaku, Tokyo, Japan

[21] Appl. No.: 63,735

[22] Filed: Aug. 6, 1979

[30] Foreign Application Priority Data

Dec. 1, 1978 [JP] Japan .......................... 53-164586[U]

[51] Int. Cl.³ ............................................ B60R 21/10
[52] U.S. Cl. ...................................... 280/804; 297/469
[58] Field of Search ............... 280/802, 803, 804, 808; 297/469

[56] References Cited

U.S. PATENT DOCUMENTS

| | | | |
|---|---|---|---|
| 3,806,155 | 4/1974 | Hafele | 280/803 |
| 3,833,239 | 9/1974 | Coenen | 280/803 |
| 3,857,581 | 12/1974 | Kaneko | 280/802 |
| 3,895,822 | 7/1975 | Seiffert | 280/802 |
| 3,897,082 | 7/1975 | Takada | 280/802 |
| 3,976,305 | 8/1976 | Fieni | 280/802 |
| 3,977,701 | 8/1976 | Weman | 280/802 |
| 4,084,841 | 4/1978 | Hayashi | 280/802 |

FOREIGN PATENT DOCUMENTS

| | | | |
|---|---|---|---|
| 2161384 | 6/1973 | Fed. Rep. of Germany | 280/804 |
| 1332741 | 10/1973 | United Kingdom | 280/804 |

*Primary Examiner*—John P. Silverstrim
*Attorney, Agent, or Firm*—Brumbaugh, Graves, Donohue & Raymond

[57] ABSTRACT

A passive vehicle occupant restraint belt system comprises a belt leading from an inboard location adjacent the lower rear portion of the seat to an outboard location adjacent the rear edge of the vehicle door. An elongated guide rail affixed on the inboard side of the seat carries a belt transfer guide having a guide ring through which the belt passes intermediate the inboard and outboard ends. The guide rail extends lengthwise along the seat and slopes upwardly from back to front. The guide ring is located at substantial distance above the guide rail, and the slope of the guide rail is such that the guide ring holds an inboard portion of the belt at substantially the level of or some distance above the level of the front of the seat when the belt transfer guide is in the forward position on the guide rail. The belt transfer guide is driven back and forth along the guide rail, preferably in response to opening and closing motions of the door.

10 Claims, 3 Drawing Figures

PASSIVE VEHICLE OCCUPANT RESTRAINT BELT SYSTEM

FIELD OF THE INVENTION

This invention relates to a passive vehicle occupant restraint belt system and, in particular, to an improvement in such a system which facilitates the entry and departure of an occupant with a minimum of interference from the belt when the belt is in the occupant-releasing configuration.

BACKGROUND OF THE INVENTION

A variety of passive vehicle occupant restraint belt systems have been proposed in which a restraint belt leads from an inboard location at the lower rearward portion of the seat across to the rear portion of the vehicle door so that when the door is opened, it carries the outboard end of the belt forward out of engagement with the occupant. Some of those systems have been put into commercial use. In most such systems, the inboard end of the belt remains stationary, thereby placing reliance entirely upon movement of the outboard end to move the belt to the release configuration. With such arrangements the part of the belt which extends across the occupant still remains quite close to his or her body, and the occupant ordinarily has to manually push the belt farther forward to be able to leave or enter the vehicle with ease.

In another type of passive belt system, which is often called a "three-point belt system," a continuous restraint belt is attached at one end to the upper rear corner of the door and at the other end to the lower rear corner of the door, and a control ring through which the restraint belt passes is attached to a control belt leading from a retractor on the inboard rear portion of the seat. The control belt is pulled out when the door is opened and pulled in when the door is closed. Although the restraint belt is moved some distance forward when the door is open, thus partially releasing the occupant, the control belt still obstructs convenient entry or departure, even in systems in which the outboard end of the lap belt portion of the restraint belt is transferred forwardly and upwardly along the door by a movable belt transfer guide.

Japanese Utility Model Publication No. 48511/77 describes and shows a seat belt system which includes a guide rail installed on the upper surface of a center console between the driver and passenger seats in front of the passenger compartment, and an occupant restraint belt leads through a guide ring mounted on a slider which moves forward and backward along the guide rail. While this construction is useful in vehicles which have a center console, it is not useful in vehicles which do not have them.

SUMMARY OF THE INVENTION

There is provided, in accordance with the present invention, an improved passive vehicle occupant restraint belt system which can be used in all types of vehicles in connection with the front (driver and passenger) seats, with or without a center console between the seats, and which essentially eliminates the problems described above as well as considerably facilitates the entry and departure of occupants. In particular, the restraint belt system, according to the present invention, comprises a belt leading from an inboard location adjacent the lower rear portion of the seat to an outboard location adjacent the rear edge of the vehicle door. An elongated guide rail affixed on the inboard side of the seat extends generally lengthwise of the vehicle from adjacent the back to adjacent the front of the side of the seat and slopes upwardly from back to front. A belt transfer guide is mounted on the guide rail to slide along the guide rail and carries a guide ring, which is preferably integral with a slider portion of the belt transfer guide. The guide ring is located at a substantial distance above the guide rail and receives a portion of the belt intermediate the inboard and outboard ends.

The slope of the guide rail upwardly from back to front, in conjunction with the elevated position of the guide ring relative to the rail, provides for lifting the belt portion which passes through the guide ring at the same time as it is transferred forwardly so that the portion is substantially at or above the level of the seat when the transfer guide is at the front end of the guide rail. A suitable driving device, which preferably is operated in response to opening and closing motions of the door, transfers the guide ring between a rearward, occupant-restraining position at the back end of the guide rail and a forward, occupant-releasing position at the front end of the guide rail.

As a further, optional but preferred feature of the present invention one end of the restraint belt is wound onto an emergency locking retractor having a spring which generates a lesser torque, the greater the length of the belt that is pulled from the retractor—in other words, the lesser the number of turns of the restraint belt that remain wound on the reel. Accordingly, as the belt is transferred forward by the belt transfer guide when it is moved to the forward, occupant-releasing position and thereby is pulled from the retractor to provide the additional length of unwound belt as the inboard portion moves forward with the ring and the outboard end moves outwardly with the door the lesser is the resistance of the retractor to the unwinding of the belt from the retractor reel. The reduction in force on the belt is reflected in smoother and easier running of the belt transfer guide as it moves forward as well as in lesser abrasion on the belt as it runs through the guide ring on the transfer guide.

The combination of both forward and upward movement of an inboard portion of the belt by the belt transfer guide provides a considerable increase in the space provided for the occupant to enter and leave the vehicle without touching the belt. It is no longer necessary for the occupant to push the belt out of the way in order to have ample room to enter and leave the vehicle comfortably and easily. The sloping of the guide rail and the location of the guide rail immediately on the side of the seat also improves the fit of the belt in the restraining configuration in that it leads from a desirable position closely adjacent to the side of the passenger and at a rearward location, thereby to fit the occupant's body well for improved safety. The location of the guide rail, the transfer guide and the drive device for the transfer guide on the inboard side of the seat places those components in a location where they are least subject to damage in the event that the vehicle is involved in an accident.

For a better understanding of the invention and for a description of further features and aspects thereof, reference may be made to the following description of an exemplary embodiment, taken in conjunction with the figures of the accompanying drawing.

DESCRIPTION OF EXEMPLARY EMBODIMENT

Figure 1:
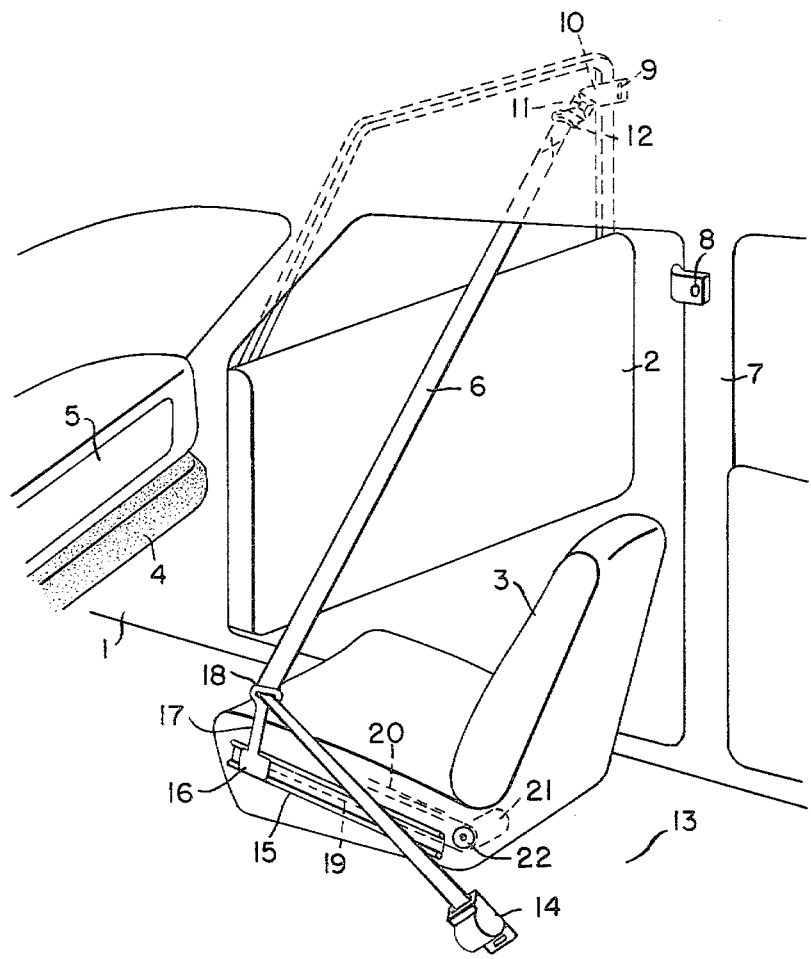
FIG. 1 is a schematic pictoral view of a first embodiment of the invention.

The embodiment of restraint belt system shown in FIG. 1 is depicted in conjunction with the front seat on the passenger side of a vehicle body 1 and makes use of the opening and closing motion of the vehicle door 2 to move the outboard upper end of a shoulder belt 6 between an occupant-restraining position (not shown) and an occupant-releasing position (shown in FIG. 1). The shoulder belt 6 restrains the torso of the occupant from being thrown forward or upward in the event of a collision or other abrupt change in the velocity of the vehicle (including upsetting of the vehicle), and a shock-absorbing knee bolster 4 mounted under the instrument panel 5 protects the legs of the occupant by restraining them and absorbing the energy of the impacts of the legs.

The inboard end of the shoulder belt 6 is wound onto an emergency locking retractor 14 that is fastened to the floor 13 of the vehicle body 1 behind and below the seat, but it can also be fastened to the side of the seat. The belt 6 leads from the retractor 14 to and through a guide ring 18 which is an integral portion of a belt transfer guide 17 which also includes a slider portion 16. The belt leads from the guide outwardly and upwardly across the seat 3 to a tongue 12 which is detachably received in an emergency release buckle 11 mounted on a bracket 10 affixed to the upper rear corner of the vehicle door 2. When the door is closed, a slot 9 in the bracket 10 mates with a flange portion on a reinforcing plate 8 which is strongly secured to the center post 7 of the vehicle body 1.

Although the system as shown in FIG. 1 has only a shoulder belt, the present invention is also useful in a so-called three-point type of restraint belt system, i.e., a system which comprises a shoulder belt, a lap belt, and a control belt connected to the inboard ends of the lap and shoulder belt and leading to a retractor at the rear inboard position, the outboard end of the lap belt and shoulder belt being fastened to the upper and lower rear corners of the door, respectively.

Figure 2:
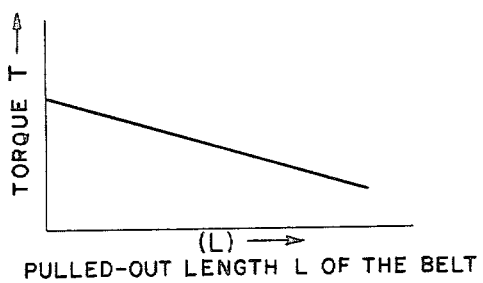
FIG. 2 is a graph which illustrates the relationship between the torque of the emergency locking retractor reel and the length of belt which is withdrawn from the retractor.

The retractor 14 is preferably constructed with a special spring which produces the torque characteristic depicted in FIG. 2 of providing a lesser torque on the retractor reel, the greater the length of belt pulled from the retractor or, to put it another way, the fewer the number of turns that remain on the retractor reel. Such a spring can be produced by varying the curvature and changing the cross sectional area along the length of the spring when it is manufactured. With such a preferred form of retractor, as the belt 6 is pulled from the retractor 14 when the door is opened, the tension on the belt 6 is reduced steadily as the door moves from closed to open.

The belt transfer guide 17 is mounted by means of the slider portion 16 on a guide rail 15 which is fastened to the inboard side surface of the seat 3. The guide rail 15 extends from near the back to near the front of the seat and slopes upwardly from back to front. The guide ring 18 of the belt transfer guide 17 is located at a substantial distance above the track so that the portion of the belt 6 which leads through the guide ring 18 will be generally at the level of the seat and preferably somewhat higher than the level of the seat, particularly in the front position, which corresponds to the occupant-releasing configuration of the belt 6. Although the guide rail may take various forms, it is preferably of generally "C" shape in cross section, thus to provide upper and lower guide-ways for receiving corresponding, complementary-shaped sliders on the slider portion 16. Such an arrangement imparts stability to the transfer guide, especially with respect to lateral pivoting. Accordingly the transfer guide 17 moves smoothly along the track without rocking or pivoting.

The belt transfer guide is driven forward and backward along the track 15 by a transfer wire 19 which is secured at one end to the transfer guide 17, leads back to and makes a half turn around an output reel 22 and then extends into a sheath 20 leading forward a sufficient distance to accept the tail end of the transfer wire when the transfer guide is at the back, restraint location. The transfer wire 19 is preferably a racked wire, and the reel 22 is the output gear of a reduction gear train which is driven by a reversible electric motor 21. In a manner that is well within the skill of the art to accomplish, the motor is controlled by a power circuit which responds to opening and closing of the door by energizing the motor 21 to drive the racked wire 19 is a direction to move the belt transfer guide 17 to the forward, occupant-releasing position at the front of the track 15 when the door is opened and energizing the motor 21 in the reverse direction to drive the wire 19 in a direction to pull the transfer guide 17 rearwardly to the back end of the track when the door is closed. The racked wire is preferably plastic or rubber coated for quieter operation.

The drive device for moving the guide 17 can also use a flexible wire turned one or more times around a drive wheel, preferably a wheel covered with rubber or some other non-friction surface which prevents slipping and reduces noise.

Also, the motor 21 depicted in FIG. 1 can be replaced by a mechanical motion amplifier such as the one described in U.S. application Ser. No. 950,020 filed Oct. 10, 1978 for "Passive Vehicle Occupant Restraint Belt System." Application Ser. No. 950,020 is commonly owned with the present application and is incorporated herein by reference.

Figure 3:
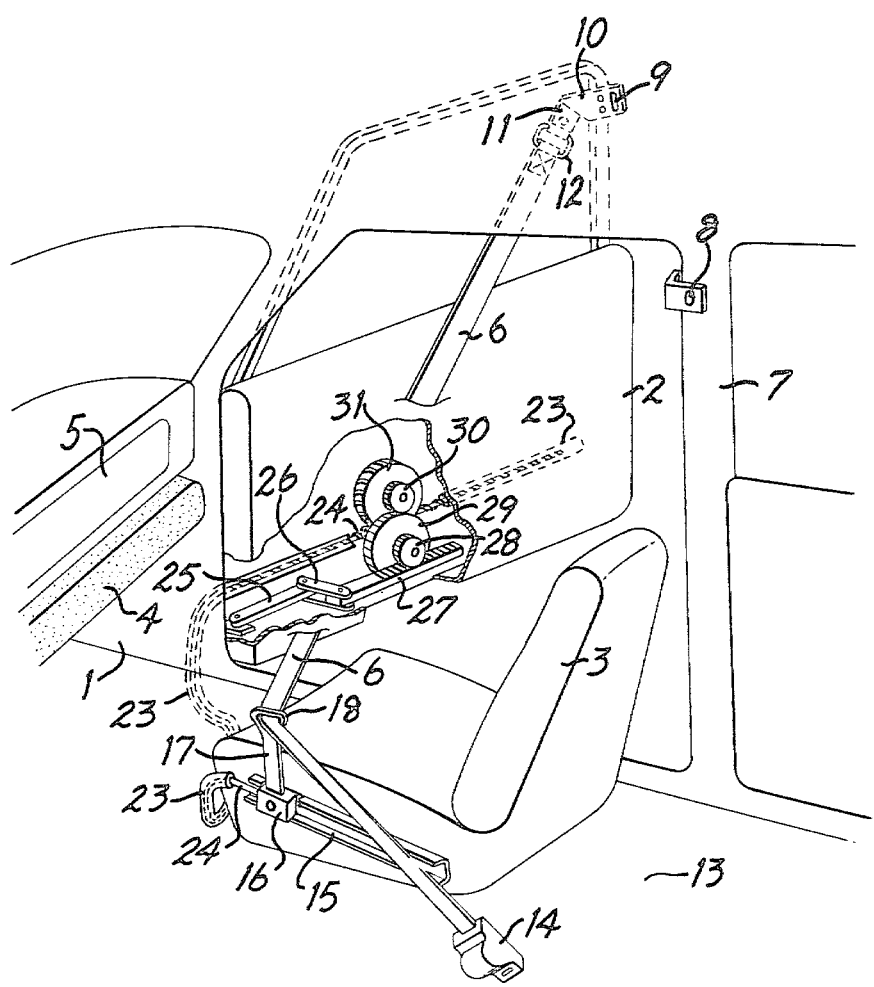
FIG. 3 is a schematic pictoral view of a second embodiment of the invention.

Looking to FIG. 3, the door 2 is provided with a motion amplifier mechanism which is comprised of a linkage assembly 25, 26 attached to the door frame at one end and attached to a rack gear 27 at the other. As the door is moved from a closed to a partially opened position, the forward end of the door pivots away from the door frame with the result that the linkage assembly 25, 26 (which is attached to the door frame) and rack gear 27 are pulled forwardly within the door. The rack gear 27 is positioned to engage a pinion 28 which is attached to and, in response to linear movement of the rack gear, rotatable with a larger concentric gear 29. The gear 29 engages a smaller gear 30 which in turn is attached to and rotatable with a larger gear 31. By this mechanism, a relatively small linear displacement of the rack gear 27 results in a relatively large angular displacement of the outer toothed edge of gear 31.

Arranged within the door 2 is a racked wire 24 supported within a guide tube 23. The racked wire engages the teeth of gear 31 and hence is caused to move backwardly within the door a relatively great distance as the door is opened and the rack gear is caused to move forwardly a relatively small distance.

The wire and tube extend forwardly within the door through the front end thereof and into the side wall of the vehicle body. The wire and tube then pass across (or under) the car floor to a position in front of the guide rail 15 from which the wire 24 extends from the tube 23 and is attached to slider portion 16 of the transfer guide 17.

In operation, as the door is partially opened, the racked wire is pulled backwardly by the gear 31 and pulls the transfer guide 17 forwardly within guide rail 15. When the door is closed, the wire is moved forwardly within the door and the wire thus moves out of the end of the tube 23 and pushes the transfer guide backwardly to the passenger restraining position.

It will be appreciated by one skilled in the art that the wire and tube must be arranged with sufficient flexibility near the seat to accommodate adjustment of the seat by the occupant.

The embodiment shown in the drawings operates as follows:

Beginning with the belt and transfer device configuration shown in FIG. 1, which is the occupant-releasing configuration of the belt system, when an occupant enters the vehicle and closes the door, a switch in the control circuit of the motor 21 energizes the motor to move the transfer wire 19 in a direction to pull the belt transfer guide 17 rearwardly along the track. Meanwhile the retractor 14 winds up the belt until the belt is fitted comfortably to the passenger. Inasmuch as the retractor is of the emergency locking type, the occupant can lean forward and otherwise shift about, and the belt will release and rewind to adjust to his or her movements. In the event of a sudden change in the velocity of the vehicle, such as in a collision or upset, the emergency locking mechanism of the retractor 14 locks the belt so that the occupant is safely restrained. The strong reinforcing plate 8 mates with the slot 9 in the bracket 10, thus strongly supporting the outboard end of the belt. In the occupant restraining configuration, the guide ring 18 of the belt transfer guide 17 resides at about the level of the seat at the rearward end of the track and close to the occupant, a position favorable to good fitting of the belt to the occupant for comfort and safety.

When the door is opened from closed position, a switch in the control circuit of the motor 21 energizes the motor in the reverse of the direction in which it was driven when the door was closed. The motor drives the transfer wire 19 in a direction to push the belt transfer guide 17 forwardly back to the position shown in FIG. 1. Alternatively, the belt transfer guide may be moved forward by the mechanical motion amplifier depicted in FIG. 3.

Meanwhile the opening motion of the door and the movement of the transfer guide pulls a length of the belt 6 from the retractor 14. As the belt is pulled out from the retractor and the pulled-out length increases, the winding torque exerted by the spring of the retractor 14 on the retractor reel becomes less (see FIG. 2). Accordingly, the movement of the transfer guide 17 to the forward, occupant-releasing location at the front of the track is facilitated. Also, the tension applied to the belt 6 is reduced, which reduces the abraiding action of the ring on the belt as the belt pulls through it. The life of the motor is increased, and a smaller motor can be used to drive the transfer device. In the releasing configuration (FIG. 1) the transfer guide ring 18 resides some distance above the level of the seat; accordingly, the belt 6 is not only moved forward away from the chest of the occupant but is also moved upwardly, thereby increasing the space for the occupant to lift up his legs and swing them out to leave the vehicle, and when the occupant enters the vehicle with the restraint belt system in the releasing configuration, there is a lot of room for the legs and torso of the occupant and a minimal obstruction to his convenient and easy entry. Another desirable feature of the invention is that if the occupant adjusts the seat forward and backward, the belt guide 17 and all of the other components of the system move with the seat, thereby permitting optimum fitting of the belt for various positions of the seat in the vehicle body. The belt remains trained to a comfortable and safe fit to the occupant.

The buckle 11 is intended as an emergency release feature. Should the retractor be locked or the transfer mechanism malfunction, or should an accident or other event make it impossible for the door to be opened, the passenger can nonetheless be released from the belt by merely unbuckling the tongue 12 from the buckle 11. It is desirable to include an alarm in association with the buckle so that the occupant will be reminded to refasten the buckle should it be undone when he enters the vehicle and the vehicle is started.

The above-described embodiment of the invention is intended to be merely exemplary, and numerous variations and modifications will readily be apparent to those skilled in the art without departing from the spirit and scope of the invention. All such variations and modifications are intended to be included within the scope of the invention as defined in the appended claims.

I claim:

1. A passive vehicle occupant restraint belt system comprising a belt leading from an inboard location adjacent the lower rear portion of the seat to an outboard location adjacent the rearward edge of the vehicle door, an elongated guide rail affixed to the seat on the inboard side of the seat, the guide rail extending generally lengthwise of the vehicle from adjacent the back to adjacent the front of the seat and sloping upwardly from back to front, a belt transfer guide mounted on the guide rail to move along the rail, the belt transfer guide including a vertically extending stem portion slidably mounted in the guide rail and a guide ring which is mounted on the stem a substantial distance above the guide rail, the belt slidably extending through the guide ring, and drive means for transferring the belt transfer guide along the guide rail between a rearward restraint position in which the ring is substantially at the level of the rear of the seat, and a forward, release position in which the guide ring is above the level of the front of the seat.

2. A restraint belt system according to claim 1 wherein the inboard end of the belt is wound on an emergency locking retractor, the retractor having a spring that generates a decreasing amount of torque as the belt is unwound from the retractor reel, thereby facilitating forward movement of the belt transfer guide.

3. A restraint belt system according to claim 1 or 2 wherein the belt transfer guide comprises a slider portion received by the guide rail and the ring is integral with the slider portion.

4. A restraint belt system according to claim 1 or 2 wherein the drive means includes an electrically powered motor.

5. A restraint belt system according to claim 1 wherein the belt is a shoulder belt, the inboard end is wound onto an emergency locking retractor, and the outboard end is fastened to the door adjacent the upper rear corner.

6. A seat belt system according to claim 5 wherein the outboard end of the shoulder belt is detachably secured to the door by a buckle and tongue.

7. A seat belt mechanism according to claim 1 or 2 wherein the drive means includes a mechanical motion amplifier adapted, in response to the motion of the front end of the vehicle door relative to the vehicle door frame upon opening and closing of the door, to move the belt transfer guide along the guide rail.

8. A seat belt mechanism according to claim 7 wherein the mechanical motion amplifier engages a wire, said wire being attached to the belt transfer guide so as to cause said belt transfer guide to move along the guide rail in response to the movement of the wire by the mechanical motion amplifier.

9. A seat belt mechanism according to claim 8 wherein the wire is a racked wire and the mechanical motion amplifier comprises a linkage assembly attached to the vehicle door frame at one end and to a rack gear at the other, said rack gear being positioned within the vehicle door such that the movement of the vehicle door relative to the door frame upon opening and closing of the door causes the rack gear to move longitudinally within the door, a pinion gear engaging said rack gear, said pinion gear engaging at least one additional gear so as to cause the rotational motion of the pinion gear to be amplified in said at least one additional gear, one of said at least one additional gear engaging the racked wire thus causing the wire to move longitudinally in response to the rotational movement of said gear.

10. A seat belt mechanism according to claim 9 wherein the pinion gear is attached to and rotatable with a larger concentric gear, said larger concentric gear engaging at least one additional gear which engages said wire.

* * * * *